Figure 1:
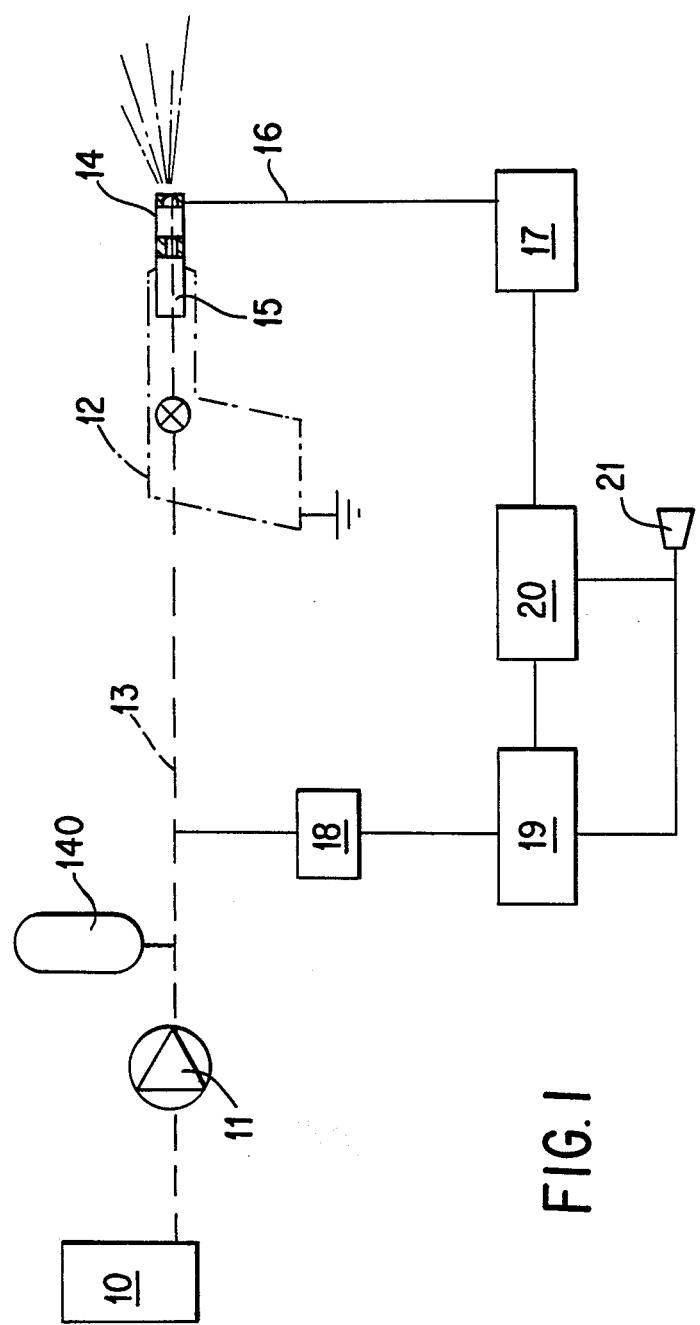

United States Patent [19]
Bray et al.

[11] Patent Number: 4,712,736
[45] Date of Patent: Dec. 15, 1987

[54] METHOD AND SYSTEM FOR MAINTAINING A SPRAY PATTERN

[75] Inventors: David J. Bray, Bromsgrove; Francis R. Piper, Evesham, both of United Kingdom

[73] Assignee: Gaydon Technology Limited, Uxbridge, United Kingdom

[21] Appl. No.: 885,819

[22] Filed: Jul. 18, 1986

Related U.S. Application Data

[63] Continuation of Ser. No. 820,897, Jan. 17, 1986, abandoned, which is a continuation of Ser. No. 684,853, Dec. 21, 1984, abandoned, which is a continuation of Ser. No. 360,643, Mar. 22, 1982, abandoned.

[30] Foreign Application Priority Data

Mar. 27, 1981 [GB] United Kingdom ............... 8109652

[51] Int. Cl.⁴ .................................... B05B 17/04
[52] U.S. Cl. ........................ 239/11; 239/72; 239/74; 239/117
[58] Field of Search ............... 239/3, 11, 63, 71, 72, 239/74, 75, 114-118, 691; 73/168, 861.08, 861.12

[56] References Cited

U.S. PATENT DOCUMENTS

| | | | |
|---|---|---|---|
| 2,315,805 | 4/1943 | Mayo, et al. | 73/861.08 |
| 2,491,445 | 12/1949 | Cunningham et al. | 73/194 |
| 3,575,145 | 4/1971 | Steiger | 239/71 |
| 4,019,653 | 4/1977 | Scherer, et al. | 239/71 |
| 4,168,327 | 9/1979 | Law | 427/4 |
| 4,614,300 | 9/1986 | Falcoff | 239/69 |

FOREIGN PATENT DOCUMENTS

| | | | |
|---|---|---|---|
| 84445 | 7/1983 | European Pat. Off. | 239/71 |
| 936671 | 11/1955 | Fed. Rep. of Germany | 239/117 |
| 1216721 | 4/1960 | France | |
| 2135505 | 12/1972 | France | |
| 2342796 | 9/1977 | France | |
| 2064826 | 6/1981 | United Kingdom | 239/63 |
| 8401775 | 2/1981 | U.S.S.R. | 239/71 |
| 810121 | 3/1981 | U.S.S.R. | 239/63 |

Primary Examiner—Andres Kashnikow
Assistant Examiner—Michael J. Forman
Attorney, Agent, or Firm—Thomas J. Greer, Jr.

[57] ABSTRACT

A method of, and system for, spraying is provided in which voltages generated by the passage of pressurized medium through a spray nozzle is monitored. The generated voltage has characteristic patterns. Monitoring the variations in these patterns or the exceeding of predetermined voltage limits enable close control to be monitored over the spraying operation and for remedial action to be taken in due time.

14 Claims, 3 Drawing Figures

METHOD AND SYSTEM FOR MAINTAINING A SPRAY PATTERN

This application is a continuation of application Ser. No. 820,897, filed Jan. 1, 1986, now abandoned; which is a continuation of application Ser. No. 684,853, filed Dec. 21, 1984, now abandoned, which is a continuation of application Ser. No. 360,643, filed Mar. 22, 1982, now abandoned.

This invention relates to a method of spraying a medium and to a system for carrying out the method. In the present context the term "medium" is used to cover not only homegeneous liquids but also to heterogeneous liquids in which particulate or fibrous components are borne by a carrier liquid.

A typical spraying system for depositing medium such as paint or other protective material onto prefabricated units comprises; a bulk storage from which a pump withdraws and pressurises medium for feeding along pipework to a spray gun for use in processes known as "airless" or "air assisted" spraying. In the case where the pump produces pulses or surges an accumulator would be fitted to smooth the flow of medium. The gun incorporates a jet, nozzle or tip from which atomised medium issues in a spray pattern. The spray pattern is dependent on a number of factors including jet shape and size, the pressure drop across the jet, the viscosity of the medium to be sprayed and (for air assisted spraying) the air supply characteristics.

According to a first aspect of the present invention there is provided a method of spraying a pressurised medium in a controlled pattern from a jet incorporated in a spraying unit characterised by the steps of:

(i) incorporating the jet in a body (14) of electrically conducting material;

(ii) insulating the body (14) from the remainder of the spray unit (12);

(iii) coupling the body (14) to a voltage monitoring means (17);

(iv) detecting the voltage on the body (14);

(v) comparing the detected voltage with at least one predetermined value thereof characterising a desired or optimum spray pattern.

A preferred method according to the first aspect of the present invention is characterised by the provision of a further step of adjusting or clearing (23) the jet (14) when the comparison step reveals an excessive discrepancy between the detected voltage and the, or a, predetermined value.

A method according to the first aspect of the present invention or the first preferred form of it is characterised by the additional step of regulating (25) the supply of pressurised medium in dependence on the detected voltage.

According to a second aspect of the present invention a spraying system for a medium in which a jet incorporated in a jet body is coupled by a feed line to a pump for pressurising medium in the feed line on the upstream side of the jet is characterised in that;

(i) the jet body (14) is of electrically conducting material coupled to, but electrically isolated from, the feed line (13);

(ii) a voltage monitor (17) is connected to sense voltage on the jet body (14);

(iii) a generating device (19, 20) is provided to establish one or more reference signals representative of an optimum spray pattern;

(iv) a comparator (17) is provided to enable the reference voltage or voltages to be compared with the voltage detected on the jet body (14).

According to a first preferred form of the second aspect of the present invention the system is characterised by a control (25) for the pump (11) to enable the pump to be regulated in response to an output of the voltage monitor (17).

According to a further preferred form of the second aspect of the present invention the system is characterised in that the feed line (13) incorporates a pressure sensor (18) for detecting instantaneous pressure in medium in the feed line (13) and the sensor (18) is adapted to provide control signals to regulate the operation of the system in the event that the pressure lies outside predetermined limits (102, 103, 104, 105) and/or a transient pressure pulse period exceeds a predetermined period. Preferably the system is characterised in that the voltage monitor (17) is a comparitor and is adapted to receive signals from the pressure sensor (18) for comparison with predetermined pressure control limits (102, 103, 104, 105). The present invention arises from considering th ionising effect occuring in medium when it is forced under pressure through a jet or nozzle. In being forced through the jet electric charges are carried away in the spray of liquid and in material entrained with it and a charge of opposite polarity is retained on the conducting jet body. It has been found that the resulting instantaneous potential relative to a nominal earth provides a measure of the stability and other operating characteristics of the resulting spray pattern.

Two embodiments of the invention will now be described with reference to the accompanying drawings of which:

FIGS. 1 and 2 are block diagrams of spray systems for depositing a protective medium on a vehicle body during manufacture thereof; and FIG. 3 shows variations in voltage, relative to time, of a jet body referred to in connection with FIGS. 1 and 2. In the descriptions associated with FIGS. 1 and 2 similar reference numerals are used to refer to components having a similar function. The flow of coating medium through the system in both figures is shown by a broken line. Electrical connections are shown by continuous lines.

Coating medium from a bulk supply 10 is fed by a reciprocating pump 11 to the body 12 of a spray gun by way of a supply line 13. Accumulator 140 is coupled to the supply line 13 and functions to absorb pressure pulses occuring in medium in line 13. The body 12 has secured to it a spray nozzle 14 (otherwise known as a jet or tip) which is of a material of low electrical resistance. The nozzle 14 is secured to the body 12 by way of a collar 15 of material which is an electrical insulator. The body 12 of the gun is earthed. Nozzle 14 is connected by a line 16 to a voltage monitoring unit 17. Liquid pressure in line 13 is detected by means of a pressure transducer 18 whose output is fed to adjustable limit setting units 19, 20. Unit 20 provides as output a signal or signals representing the limiting continuous operation pressures which are acceptable during operation of the system. Unit 19 provides a signal representing predetermined limits of operating pressure for transient pressure pulses for the system and voltage detected on the jet body. In the event that either or both units 19, 20 detects an out-of-limit condition, an alarm 21 is operated. Under normal operating conditions, the output of transducer 18 is fed to a monitor to display a visual trace of the operation of the system for evaluation by an operator.

Figure 3:
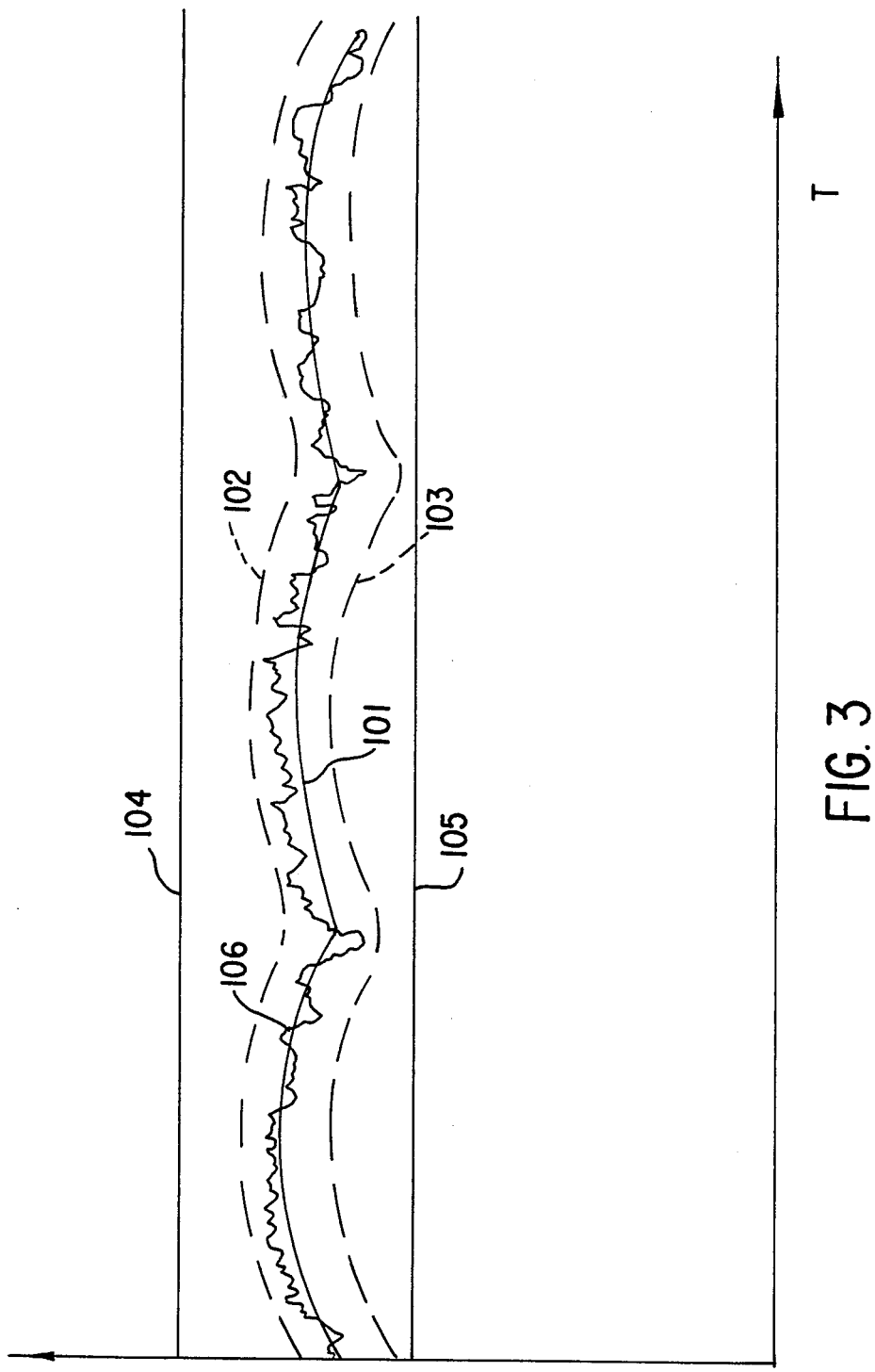

FIG. 3 shows a typical visual display record of voltage (V) in the form of a voltage analogue against time (T). Trace 101 is of a voltage analogue corresponding to supply line pressure as sensed by transducer 18. The distinctively humped appearance arises from the pressurising of the medium in the supply line 13 by the pump 11 which is of double acting reciprocating type. The fine pressure limits shown as traces 102, 103 are generated by fine limit setting unit 19. The gross predetermined limits of traces 104, 105 are generated by gross limit setting unit 20. The trace 106 represent the voltage arising from the electrical charge generated on the body 14 of the nozzle on ionisation of medium forced through the nozzle and forming a spray of medium for subsequent deposition on a vehicle body.

Figure 2:
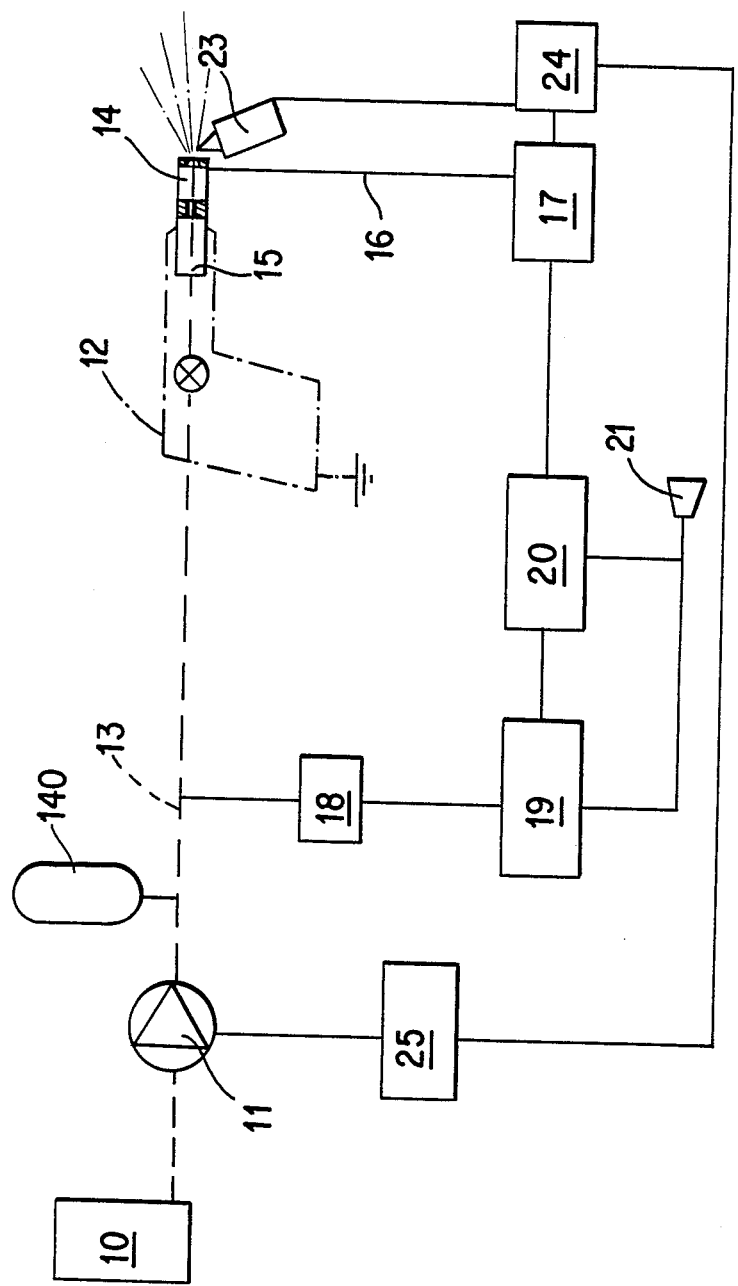

FIG. 2, in addition to items whose function is similar to that already described in connection with FIG. 1, incorporates certain additional components. The nozzle 14 has mounted with it on gun 12 a nozzle size adjuster 23 (which incorporates a mechanical clearing device). When the voltage monitor 17 detects a change in voltage on nozzle body 14 (for example due to partial blockage of the nozzle with a consequent drop in throughput of sprayable medium) a feedback control unit 24 responds to an output from the monitor 17 and energises the adjustor 23 to act in a sense to restore the voltage on nozzle body 14 to the predetermined value. This can be achieved by either momentarily changing the size of the nozzle or by operating a mechanical device for clearing the orifice. In this situation the nozzle body 14, monitor 17, control unit 24 and adjustor 23 operate as a feedback loop controlling the operation of the jet in nozzle body 14.

A pump control unit 25 is provided as an alternative to the adjustor 23 or as a further regulator for operation of the system. The feedback control 24 transmits a signal to pump control unit 25 if the monitor 17 output indicates a progressive change in the voltage on the nozzle body 14. This could arise, for example, in the use of a fresh supply of medium which differs in viscosity from the medium previously used. In this case the control 24 operates to use the pump control unit 25 to appropriately vary the pump speed.

One advantage afforded by the embodiment illustrated in FIG. 3 arises from the self-regulatory control of the system. Once the system has been set up to provide an optimised spray pattern from the jet the system tends to restore the desired pattern regardless of changes such as partial blockages, changes in pressure drop, and changes in medium viscosity. The system described thus lends itself for use in robot spraying systems or in spraying environments where a human operator would be faced with health hazard.

Apart from the self-regulator control analysis of the tip, voltage traces corresponding to trace 106 in FIG. 3 enable a range of information as to the system and the sprayed material to be obtained. The wear of the jet can be sensed so that jets nearing the end of their useful life can be replaced. The condition of the medium to be sprayed gives a distinctive pattern whose displacement indicates a change in a material characteristic such as density or homogeniety. Deterioration or unauthorised modification in pump performance can be identified at an early stage. Blockage in the supply line also produces a displacement in the trace pattern which allows rectification before efficient operation is impaired. It is also possible to check that the spray pattern is appropriate on setting up a new jet for a given function.

We claim:

1. A method of maintaining an optimum spray pattern during spraying of a pressurized medium from a spray unit, the spray unit having an adjustable nozzle formed of electrically conducting material but which is electrically isolated from the remainder of the spray unit, so that during spraying a voltage is generated on the nozzle by the atomization of the pressurized medium flowing therethrough, the method comprising the steps of:
   (1) monitoring the voltage generated on the nozzle as a medium is sprayed from the nozzle in a spary pattern;
   (2) comparing the monitored voltage with at least one reference voltage indicative of the optimum spray pattern;
   (3) sensing any deviation of the monitored voltage beyond predetermined limits;
   (4) taking corrective action, in response to any sensed deviation of the monitored voltage beyond predetermined limits, such corrective action selected from the steps of (1) adjusting the nozzle size (2) adjusting the pressure of the pressurized medium, (3) clearing the nozzle, so as to restore the monitored voltage back within the predetermined limits, thereby insuring that an optimized spray pattern is maintained.

2. A method according to claim 1 further comprising the additional steps of:
   (1) monitoring the instantaneous pressure of the medium supplied to the nozzle;
   (2) comparing the monitored pressure with at least one reference pressure;
   (3) indicating deviation of the monitored pressure beyond predetermined limits;
   (4) selectively taking said corrective action in response to an indicated deviation of the monitored pressure beyond the predetermined limits.

3. A method according to claim 2 wherein the indicated deviation of the monitored pressure beyond said prdetermined limits is used to provide a control signal used to automatically adjust the flow of the pressurized medium to the nozzle, so as to restore the monitored pressure to within said predetermined limits, thereby insuring that an optimized spray pattern is maintained.

4. A method according to claim 1 wherein the indicated deviation of the monitored voltage beyond said predetermined limits is used to provide an alarm signal.

5. A method according to claim 1 wherein the indicated deviation of the monitored voltage beyond said predetermined limits is used to provide a control signal to a nozzle size adjuster to automatically adjust the nozzle size, so as to restore the monitored voltage to within the predetermined limits, thereby insuring that an optimized spray pattern is maintained.

6. A method according to claim 1 wherein the indicated deviation of the monitored voltage beyond said predetermined limits is used to provide a control signal used to automatically adjust the flow of the pressurized medium to the nozzle, so as to restore the monitored voltage to within the predetermined limits, thereby insuring that an optimized spray pattern is maintained.

7. A method according to claim 1 wherein the medium sprayed from the nozzle is paint.

8. A spraying system for maintaining an optimized spray pattern comprising: a spray unit having an adjustable nozzle which is coupled by a feed line to a pump supplying pressurized medium, the nozzle being formed of electrically conducting material but being electrically isolated from the remainder of the spray unit; a voltage monitoring means to monitor the voltage generated on the nozzle by the atomization of the pressurized medium flowing through the nozzle as the medium is sprayed from the nozzle in a spray pattern; a voltage comparator means to compare the monitored voltage with at least one reference voltage indicative of a desired spray pattern and to detect any deviation of the monitored voltage beyond predetermined limits if an out of limit condition is detected, means for taking corrective action, said last mentioned means selected from (1) means for adjusting the nozzle size, (2) means for adjusting the pressure of the pressurized medium, (3) means for clearing the nozzle, the arrangement being such that in response to the detection of the deviation of the monitored voltage beyond the predetermined limits corrective action is taken by actuating one of said means for taking corrective action to thereby restore the monitored voltage back within the predetermined limits, thereby insuring that an optimized spray pattern is maintained.

9. A system according to claim 8 further comprising: a pressure monitoring means to monitor the instantaneous pressure of the medium supplied to the nozzle, a pressure comparator means to compare the monitored pressure with at least one reference pressure and to provide an indication of a deviation of the monitored pressure beyond predetermined limits if an out of limit condition is detected, the arrangement being such that in response to the indication of the deviation of the monitored pressure beyond the predetermined limits said appropriate corrective action can be taken to restore the monitored pressure back within the predetermined limits, thereby insuring that an optimized spray pattern is maintained.

10. A system according to claim 9 further comprising an automatic pump control unit, wherein the indication of the deviation of the monitored pressure beyond the predetermined limits activates the pump control unit to supply a control signal to the pump to automatically adjust the flow of pressurized medium from the pump to the nozzle to restore the monitored pressure to within said predetermined limits, thereby insuring that an optimized spray pattern is maintained.

11. A system according to claim 8 wherein the indication of the deviation of the monitored voltage beyond said predetermined limits is arranged to provide an alarm signal.

12. A system according to claim 11 further comprising an automatic nozzle size adjuster and a control unit therefor, wherein the indication of the deviation of the monitored voltage beyond said predetermined limits activates the control unit to supply a control signal to the nozzle size adjuster to automatically adjust the nozzle size in order to restore the monitored voltage to within said predetermined limits, thereby insuring that an optimized spray pattern is maintained.

13. A system according to claim 8 further comprising an automatic pump control unit, wherein the indication of the deviation of the monitored voltage beyond said predetermined limits activates the pump control unit to supply a control signal to the pump to automatically adjust the flow of pressurized medium from the pump to the nozzle to restore the monitored voltage to within said predetermined limits, thereby insuring that an optimized spray pattern is maintained.

14. A system according to claim 8 wherein the spraying system is a paint spraying system.

* * * * *